(12) United States Patent
Tang et al.

(10) Patent No.: US 12,288,348 B2
(45) Date of Patent: Apr. 29, 2025

(54) DEPTH ESTIMATION BASED ON EGO-MOTION ESTIMATION AND RESIDUAL FLOW ESTIMATION

(71) Applicant: TOYOTA RESEARCH INSTITUTE, INC., Los Altos, CA (US)

(72) Inventors: Jiexiong Tang, Stockholm (SE); Rares Andrei Ambrus, San Francisco, CA (US); Vitor Guizilini, Santa Clara, CA (US); Adrien David Gaidon, Mountain View, CA (US)

(73) Assignee: TOYOTA RESEARCH INSTITUTE, INC., Los Altos, CA (US)

( * ) Notice: Subject to any disclaimer, the term of this patent is extended or adjusted under 35 U.S.C. 154(b) by 13 days.

(21) Appl. No.: 18/344,700

(22) Filed: Jun. 29, 2023

(65) Prior Publication Data

US 2023/0342960 A1    Oct. 26, 2023

Related U.S. Application Data

(63) Continuation of application No. 17/230,941, filed on Apr. 14, 2021, now Pat. No. 11,727,588.
(Continued)

(51) Int. Cl.
*G06T 7/55* (2017.01)
*G06T 3/18* (2024.01)
(Continued)

(52) U.S. Cl.
CPC .................. *G06T 7/55* (2017.01); *G06T 3/18* (2024.01); *G06T 3/4007* (2013.01);
(Continued)

(58) Field of Classification Search
CPC .......... G06T 7/55; G06T 3/18; G06T 3/4007; G06T 3/4046; G06T 7/70; G06T 19/00;
(Continued)

(56) References Cited

U.S. PATENT DOCUMENTS 11,727,588 B2    8/2023  Tang et al.
2020/0167941 A1*  5/2020  Tong ....................... G01S 13/89
(Continued)

FOREIGN PATENT DOCUMENTS

IN    201821047954 A  *  5/2022

*Primary Examiner* — Chan S Park
*Assistant Examiner* — Daniel C Chang
(74) *Attorney, Agent, or Firm* — Seyfarth Shaw LLP

(57) ABSTRACT

A method for depth estimation performed by a depth estimation system associated with an agent includes determining a first depth of a first image and a second depth of a second image, the first image and the second image being captured by a sensor associated with the agent. The method also includes generating a first 3D image of the first image based on the first depth, a first pose associated with the sensor, and the second image. The method further includes generating a warped depth image based on transforming the first depth in accordance with the first pose. The method also includes updating the first pose based on a second pose associated with the warped depth image and the second depth, and updating the first 3D image based on the updated first pose. The method further includes controlling an action of the agent based on the updated first 3D image.

20 Claims, 7 Drawing Sheets

Related U.S. Application Data

(60) Provisional application No. 63/009,935, filed on Apr. 14, 2020.

(51) Int. Cl.
    *G06T 3/4007*     (2024.01)
    *G06T 3/4046*     (2024.01)
    *G06T 7/70*     (2017.01)
    *G06T 19/00*     (2011.01)
    *G06V 20/56*     (2022.01)

(52) U.S. Cl.
    CPC .............. *G06T 3/4046* (2013.01); *G06T 7/70* (2017.01); *G06T 19/00* (2013.01); *G06V 20/56* (2022.01); *G06T 2207/30244* (2013.01)

(58) Field of Classification Search
    CPC . G06T 2207/30244; G06T 2207/10024; G06T 2207/20081; G06T 2207/20084; G06T 2207/30261; G06T 7/579; G06V 20/56
    See application file for complete search history.

(56) References Cited

U.S. PATENT DOCUMENTS

2022/0242407 A1\*   8/2022   Shashua ............ B60W 30/0956
2022/0292701 A1\*   9/2022   Mahjourian ............ G06T 7/579

\* cited by examiner

DEPTH ESTIMATION BASED ON EGO-MOTION ESTIMATION AND RESIDUAL FLOW ESTIMATION

CROSS-REFERENCE TO RELATED APPLICATION

The present application is a continuation of U.S. patent application Ser. No. 17/230,941, filed on Apr. 14, 2021, and titled "DEPTH ESTIMATION BASED ON EGO-MOTION ESTIMATION AND RESIDUAL FLOW ESTIMATION," which claims the benefits of U.S. Provisional Patent Application No. 63/009,935, filed on Apr. 14, 2020, and titled "DEPTH LEARNING VIA EGO-MOTION AND RESIDUAL FLOW ESTIMATION USING PHOTOMETRIC AND GEOMETRIC LOSSES," the disclosures of which are expressly incorporated by reference in their entireties.

FIELD OF THE DISCLOSURE

Certain aspects of the present disclosure generally relate to scene reconstruction systems.

BACKGROUND

An agent, such as an autonomous agent, may reconstruct a three-dimensional map of a scene based on one or more images obtained from a sensor. The agent may also localize its location in an environment (e.g., map) based on sensor information (e.g., GPS information). Localization and scene reconstruction may be used to perform various tasks, such as scene understanding, motion planning, and/or obstacle avoidance. For example, the agent may autonomously navigate through an environment based on the localization information and the scene reconstruction. Depth estimation may be used to understand (e.g., reconstruct) the structure of a scene. In some examples, a 3D representation of an environment may be generated from one or more depth estimates. An increase in an accuracy of the 3D representation improves the autonomous agent's ability to perform various tasks, such as autonomous navigation.

SUMMARY

In one aspect of the present disclosure, a method for depth estimation includes determining a first pose of a sensor based on a first image captured by the sensor and a second image captured by the sensor. The method further includes determining a first depth of the first image and a second depth of the second image. The method still further includes generating a warped depth image based on at least the first depth and the first pose. The method also includes determining a second pose based on the warped depth image and the second depth image. The method further includes updating the first pose based on the second pose. The method still further includes updating a first warped image based on the updated first pose.

Another aspect of the present disclosure is directed to an apparatus for depth estimation. The apparatus includes means for determining a first pose of a sensor based on a first image captured by the sensor and a second image captured by the sensor. The apparatus further includes means for determining a first depth of the first image and a second depth of the second image. The apparatus still further includes means for generating a warped depth image based on at least the first depth and the first pose. The apparatus also includes means for determining a second pose based on the warped depth image and the second depth image. The apparatus further includes means for updating the first pose based on the second pose. The apparatus still further includes means for updating a first warped image based on the updated first pose.

In another aspect of the present disclosure, a non-transitory computer-readable medium with non-transitory program code recorded thereon for depth estimation is disclosed. The program code is executed by a processor and includes program code to determine a first pose of a sensor based on a first image captured by the sensor and a second image captured by the sensor. The program code further includes program code to determine a first depth of the first image and a second depth of the second image. The program code still further includes program code to generate a warped depth image based on at least the first depth and the first pose. The program code also includes program code to determine a second pose based on the warped depth image and the second depth image. The program code further includes program code to update the first pose based on the second pose. The program code still further includes program code to update a first warped image based on the updated first pose.

Another aspect of the present disclosure is directed to an apparatus having a memory, one or more processors coupled to the memory, and instructions stored in the memory and operable, when executed by the processor, to cause the apparatus to determine a first pose of a sensor based on a first image captured by the sensor and a second image captured by the sensor. The execution of the instructions further cause the apparatus to determine a first depth of the first image and a second depth of the second image. The execution of the instructions also cause the apparatus to generate a warped depth image based on at least the first depth and the first pose. The execution of the instructions still further cause the apparatus to determine a second pose based on the warped depth image and the second depth image. The execution of the instructions further cause the apparatus to update the first pose based on the second pose. The execution of the instructions also cause the apparatus to update a first warped image based on the updated first pose.

Aspects generally include a method, apparatus, system, computer program product, non-transitory computer-readable medium, user equipment, base station, wireless communication device, and processing system as substantially described with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

Figure 1:
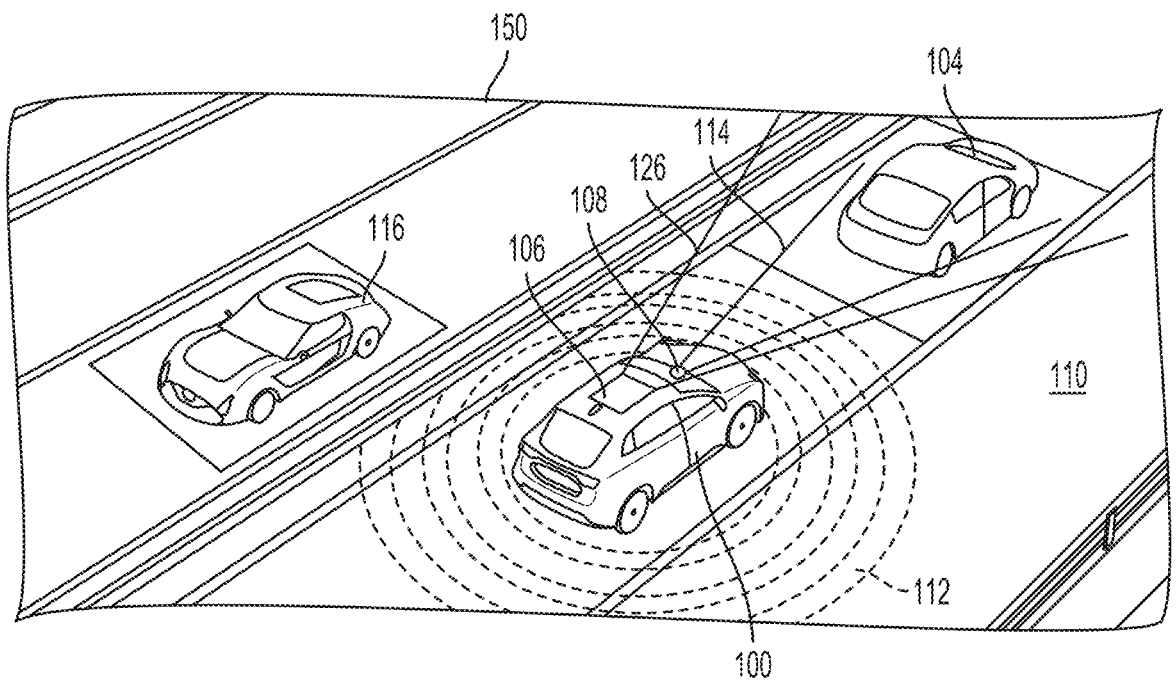
FIG. 1 illustrates an example of a vehicle in an environment according to aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. It will be apparent to those skilled in the art, however, that these concepts may be practiced without these specific details. In some instances, well-known structures and components are shown in block diagram form in order to avoid obscuring such concepts.

An agent, such as an autonomous agent, may generate a 3D representation of an environment based on one or more images obtained from a sensor. The 3D representation may also be referred to as a 3D model, a 3D scene, or a 3D map. 3D representations may facilitate various tasks, such as scene understanding, motion planning, and/or obstacle avoidance. For example, the agent may autonomously navigate through an environment based on the 3D representation.

The ability to perceive distances through depth estimation based on sensor data provides an ability to plan/estimate ego-motion through the environment. However, depending on the available onboard sensors, the agent may acquire a limited perspective of the environment. As a result, the agent may encounter difficulties in distinguishing aspects of the environment.

That is, various sensors perceive aspects of the environment differently and have different implementation characteristics. For example, LiDAR (light detection and ranging) provides improved depth perception but may encounter errors in certain weather conditions. Other sensors, such as stereo cameras, may capture depth information but may have a limited field-of-view. Monocular cameras may be cost-effective, however, the sensor data does not explicitly include depth information.

In some cases, an agent implements processing routines for deriving depth information from the monocular images. For example, conventional depth networks generate 3D representations based on hand-engineered features. That is, the depth network may be trained to estimate depth via labeled data (e.g., supervised training).

Deep learning approaches, such as self-supervised learning, may eliminate hand-engineered features (e.g., labeled data) and improve depth estimates as well as 3D model reconstruction. For example, deep learning approaches improve the reconstruction of textureless regions and/or geometrically under-determined regions. Aspects of the present disclosure are directed to improving depth estimates and single-image scene reconstruction via self-supervised learning. Aspects of the present disclosure are directed to improving single-image scene reconstruction via self-supervised learning. The single-image scene reconstruction may account for residual flow based on pixel-wise residual flow estimates.

Aspects of the present disclosure are not limited to an autonomous agent. Aspects of the present disclosure also contemplate an agent operating in a manual mode or a semi-autonomous mode. In the manual mode, a human driver manually operates (e.g., controls) the agent. In the autonomous mode, an agent control system operates the agent without human intervention. In the semi-autonomous mode, the human may operate the agent, and the agent control system may override or assist the human. For example, the agent control system may override the human to prevent a collision or to obey one or more traffic rules.

FIG. 1 illustrates an example of an ego vehicle 100 (e.g., ego agent) in an environment 150 according to aspects of the present disclosure. As shown in FIG. 1, the ego vehicle 100 is traveling on a road 110. A first vehicle 104 (e.g., other agent) may be ahead of the ego vehicle 100, and a second vehicle 116 may be adjacent to the ego vehicle 100. In this example, the ego vehicle 100 may include a 2D camera 108, such as a 2D RGB camera, and a second sensor 106. The second sensor 106 may be another RGB camera or another type of sensor, such as RADAR and/or ultrasound. Additionally, or alternatively, the ego vehicle 100 may include one or more additional sensors. For example, the additional sensors may be side facing and/or rear facing sensors.

In one configuration, the 2D camera 108 captures a 2D image that includes objects in the 2D camera's 108 field of view 114. The second sensor 106 may generate one or more output streams. The 2D image captured by the 2D camera includes a 2D image of the first vehicle 104, as the first vehicle 104 is in the 2D camera's 108 field of view 114.

The information obtained from the sensors 106, 108 may be used to navigate the ego vehicle 100 along a route when the ego vehicle 100 is in an autonomous mode. The sensors 106, 108 may be powered from electricity provided from the vehicle's 100 battery (not shown). The battery may also power the vehicle's motor. The information obtained from the sensors 106, 108 may be used to generate a 3D representation of an environment.

As discussed, conventional systems use one or more sensors, such as LIDAR, to build 3D representations of a local environment. LIDAR sensors may provide reliable and accurate range data at large distances. A LIDAR sensor may be used for a variety of applications, such as mapping, localization, object detection, and collision avoidance.

Still, due to their cost, LIDAR sensors may not be economically viable. Additionally, a LIDAR sensor's 3D reconstruction may be sparse. Cameras, such as a red-green-blue (RGB) camera, may provide dense scene information and a spatial understanding of the scene by reasoning across space and time. Additionally, cameras may be more economically viable in comparison to LIDAR sensors.

Aspects of the present disclosure are directed to a system for training and using a depth network to build 3D representation from one or more images captured by a single camera. In one configuration, the self-supervised training for image-based depth estimation leverages geometric constraints inherent in robots.

In one configuration, depth and ego-motion are estimated from monocular camera imagery. Aspects of the present disclosure improve monocular depth estimates generated from a depth network trained in a self-supervised manner. Improved monocular depth estimates bridge a gap between LIDAR and vision solutions, such that cameras may augment, complement, or substitute range sensors (e.g., LIDAR sensors).

The bridged gap may reduce costs and provide an increased number of robust solutions because cameras compliment range sensor functionality. For example, in comparison to a LIDAR sensor, a camera may function better in some environments, such as a rainy environment. In contrast, in comparison to the camera, the LIDAR sensor may function better in other environments, such as low-light conditions. Therefore, monocular depth estimates may improve an agent's ability to perform various tasks.

Furthermore, cameras may produce a greater amount of image data in comparison to LIDAR data. The image data may be used as training data for a depth network. As such, the use of a monocular sensor may increase the amount of training data, thereby improving self-supervised monocular depth estimates.

In the current disclosure, unless otherwise noted, a self-supervised monocular depth network refers to a depth network trained in a self-supervised manner to generate a 3D representation from a single-camera. Self-supervised training refers to learning from raw input data without any ground-truth information. The self-supervised monocular depth network may also be referred to as a self-supervised single-camera depth network. At training time, a camera motion between timesteps (e.g., frames) may be assumed. This motion may be estimated to derive the training signal while optimizing the self-supervised monocular depth network.

A supervised monocular depth network refers to a depth network trained in a supervised manner. The supervised monocular depth network learns an estimation function by regressing input images to estimated depth outputs. In supervised training, the network learns from ground-truth information, such as ground-truth depth information collected by a sensor, such as LIDAR. For example, supervised monocular depth networks may use ground truth depth (e.g., LIDAR data) to train a neural network as a regression model. As such, camera motion does not need to be estimated during supervised training.

In a supervised depth network, a convolutional neural network generates an initial coarse prediction and refines the prediction using another neural network to produce more accurate results. Ground truth depth labels are expensive and time-consuming to generate. For example, a task of manually labeling outdoor scenes is time consuming.

Thus, some conventional depth networks are trained with stereo cameras to mitigate the need for ground-truth depth labels. In a stereo-camera setting, a baseline distance between two cameras is known and fixed. Therefore, a stereo-camera depth network may estimate depth without estimating the camera's motion between timesteps.

Conventional pose estimation systems implement different models and processes for monocular pose estimation. Some conventional pose estimation systems use dense networks that receive two input images and output the transformation between them. Other conventional systems generate sparse keypoint networks that extract keypoints from input images and match them to images in a database of images.

Conventional pose estimation systems assume a static world. Some conventional pose estimation systems learn a single transformation between images, this transformation is assumed to be the camera's own motion (ego-motion). This transformation may be reflected in all observed pixels. In some cases, a pose network learns the ego-motion. Dynamic objects present a challenge for self-supervised monocular depth networks. In some cases, depth networks may fail to train in scenes when one or more dynamic objects are present.

Conventional pose estimation systems use various methods to alleviate errors caused by dynamic objects. These methods may include the use of masks, motion models for objects, and the joint estimation of optical flow. Still, these methods specify additional information at training time or the use of extra networks for training.

As described, some conventional pose estimation systems address dynamic objects by masking out the dynamic objects or learning motion models for the dynamic objects. For example, a conventional depth network may obtain semantic or instance segmentation from another pre-trained network to generate a mask. The depth and pose networks cannot learn from masked out objects, thereby reducing model accuracy. Additionally, the masks may mask static objects used for ego-motion estimation. Additionally, semantic or instance masks are learned via supervised training, which is in contrast to the self-supervised learning of the current disclosure.

Some conventional pose estimation systems do not assume a static world and learn a motion of each pixel in an image. The motion of each pixel may be referred to as optical flow. Optical flow estimation may be challenging due to its ambiguity and lack of training data. For example, training data may be limited due to the difficulty in annotating (e.g., labeling) real images. Additionally, synthetic datasets are limited due to domain adaptation problems.

As described above, some conventional pose estimation systems use motion models. Motion models use semantic and/or instance information to segment objects in the scene. The segmented objects are assigned to a particular motion model for tracking to compensate for external motion. Motion models may use additional system resources, such as power and memory.

Aspects of the present disclosure may train a pose estimation network to account for all motion, not only a residual. In most cases, it is assumed that a majority of the motion in a scene may correspond to the camera's own motion (e.g., ego-motion). Still, some motion may be attributed to dynamic objects.

As described, in some examples, each individual pixel for the target image is warped according to its own depth and pose estimates to generate a reconstructed image (e.g., warped source image). A scene reconstruction network may be trained on the difference between the target image and the reconstructed image. The network may be trained to minimize the loss, such as a photometric loss. In some implementations, depth networks and pose networks may be simultaneously trained to learn depth, camera motion, and external pixel-wise motion. The network may be trained to account for external pixel-wise motion, such that the network correctly warps pixels with external motion. In such implementations, correctly warped pixels are aligned between frames even considering the presence of dynamic objects.

Conventional convolutional architectures use striding and pooling to increase field sizes. The striding and pooling may decrease model performance for tasks requiring fine-grained representations. Additionally, conventional upsampling processes fail to propagate and preserve sufficient details at the decoder layers, thereby reducing the accuracy of depth predictions.

In contrast to conventional convolutional architectures, some aspects of the present disclosure implement an encoder-decoder architecture with 3D packing and unpacking blocks. In some such aspects, the packing and unpacking blocks downsample and upsample feature maps during the encoding and decoding stages. In some examples, the packing and unpacking blocks learn to jointly preserve and recover spatial information for depth estimation.

In some implementations, a packing block folds the spatial dimensions of convolutional feature maps into additional feature channels. That is, the feature space is concatenated. The resulting tensor is at a reduced resolution. In contrast to striding or pooling, the spatial dimension transformation is invertible and comes at no loss. Next, the concatenated feature space is compressed to reduce its dimensionality to a desired number of output channels. Specifically, the concatenated feature space is expanded via a 3D convolutional layer. The resulting higher dimensional feature space is then flattened via reshaping before applying the final 2D convolutional contraction.

In some examples, the unpacking block may decompress and unfold packed convolutional feature channels back to higher resolution spatial dimensions during the decoding process. The unpacking block replaces convolutional feature upsampling, typically performed via nearest-neighbor or with learnable transposed convolutional weights. The unpacking process reverses the 3D packing process performed by the encoder.

During the unpacking process, a 2D convolutional layer produces the required number of feature channels for a subsequent 3D convolutional layer. The 3D convolution expands the compressed spatial features. The unpacked features are then converted back to spatial details via a reshape operation to obtain a tensor with the desired number of output channels and target higher resolution. Aspects of the present disclosure are not limited to the packing and unpacking described above.

Figure 2A:
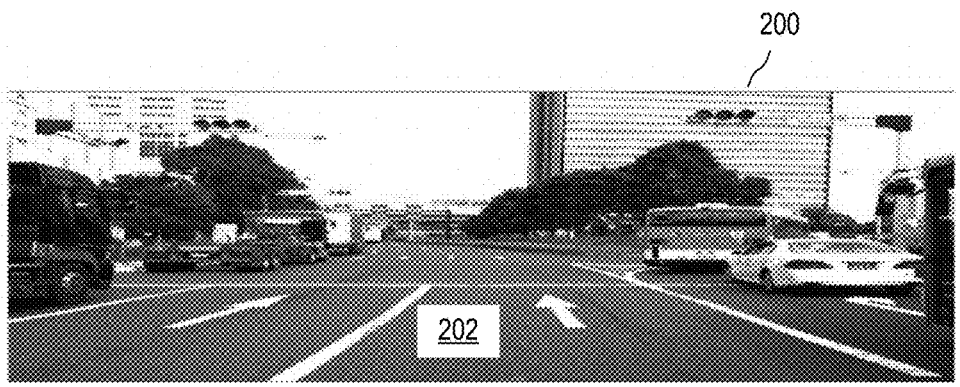
FIG. 2A is an example of a single image according to aspects of the present disclosure.

FIG. 2A illustrates an example of a target image 200 of a scene 202 according to aspects of the present disclosure. The target image 200 may be captured by a monocular camera. The monocular camera may capture a forward-facing view of an agent (e.g., a vehicle). In one configuration, the monocular camera is integrated with the vehicle. For example, the monocular camera may be defined in a roof structure, windshield, grill, or other portion of the vehicle. The vehicle may have one or more cameras and/or other types of sensors. The target image 200 may also be referred to as a current image. The target image 200 captures a 2D representation of a scene.

Figure 2B:
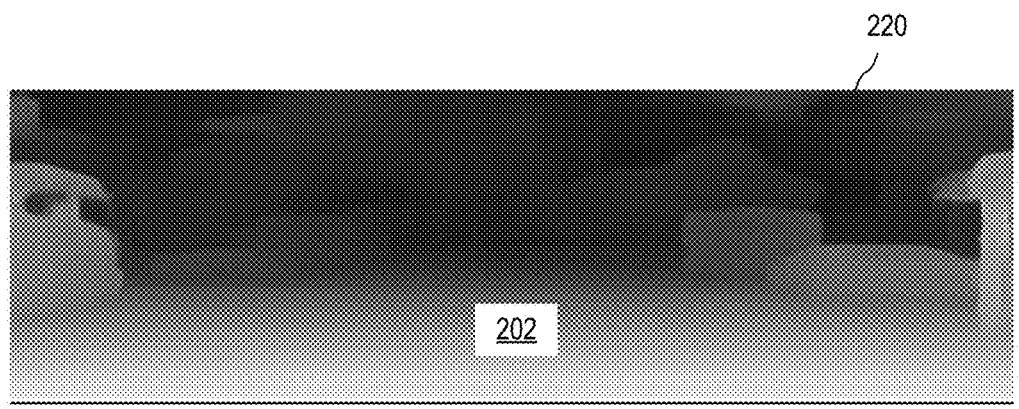
FIG. 2B is an example of a depth map according to aspects of the present disclosure.

FIG. 2B illustrates an example of a depth map 220 of the scene 202 according to aspects of the present disclosure. The depth map 220 may be estimated from the target image 200 and one or more source images. The source images may be images captured at a previous time step in relation to the target image 200. The depth map 220 provides a depth of a scene. The depth may be represented as a color or other feature.

Figure 2C:
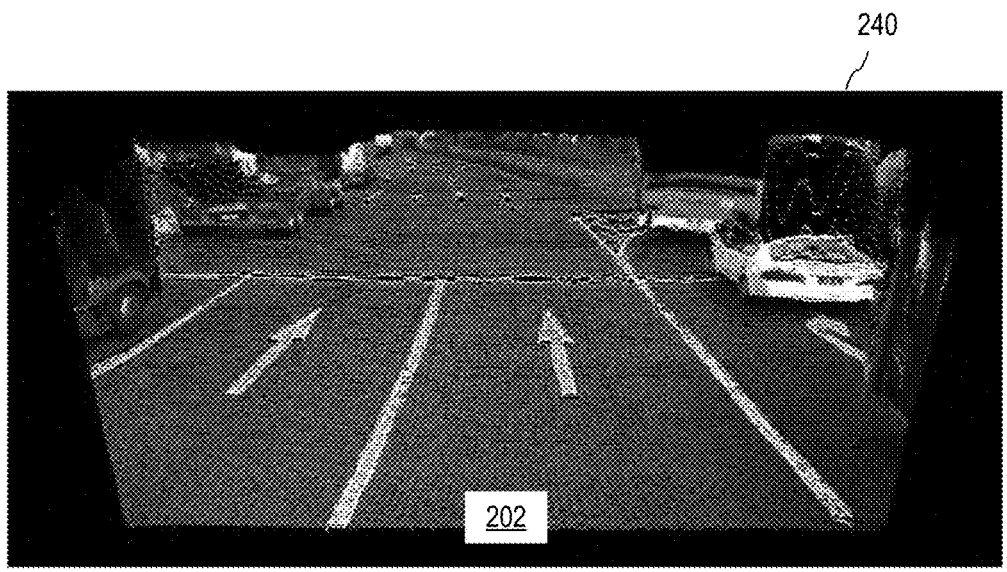
FIG. 2C is an example of a reconstructed target image according to aspects of the present disclosure.

FIG. 2C illustrates an example of a 3D reconstruction 240 of the scene 202 according to aspects of the present disclosure. The 3D reconstruction may be generated from the depth map 220 as well as a pose of a sensor determined based on the target image 200 and a source image. As shown in FIGS. 2A and 2C, the viewing angle of the scene 202 in the 3D reconstruction 240, is different from the viewing angle of the scene 202 in the target image 200. Because the 3D reconstruction 240 is a 3D view of the scene 202, the viewing angle may be changed as desired. The 3D reconstruction 240 may be used to control one or more actions of the agent.

Figure 3:
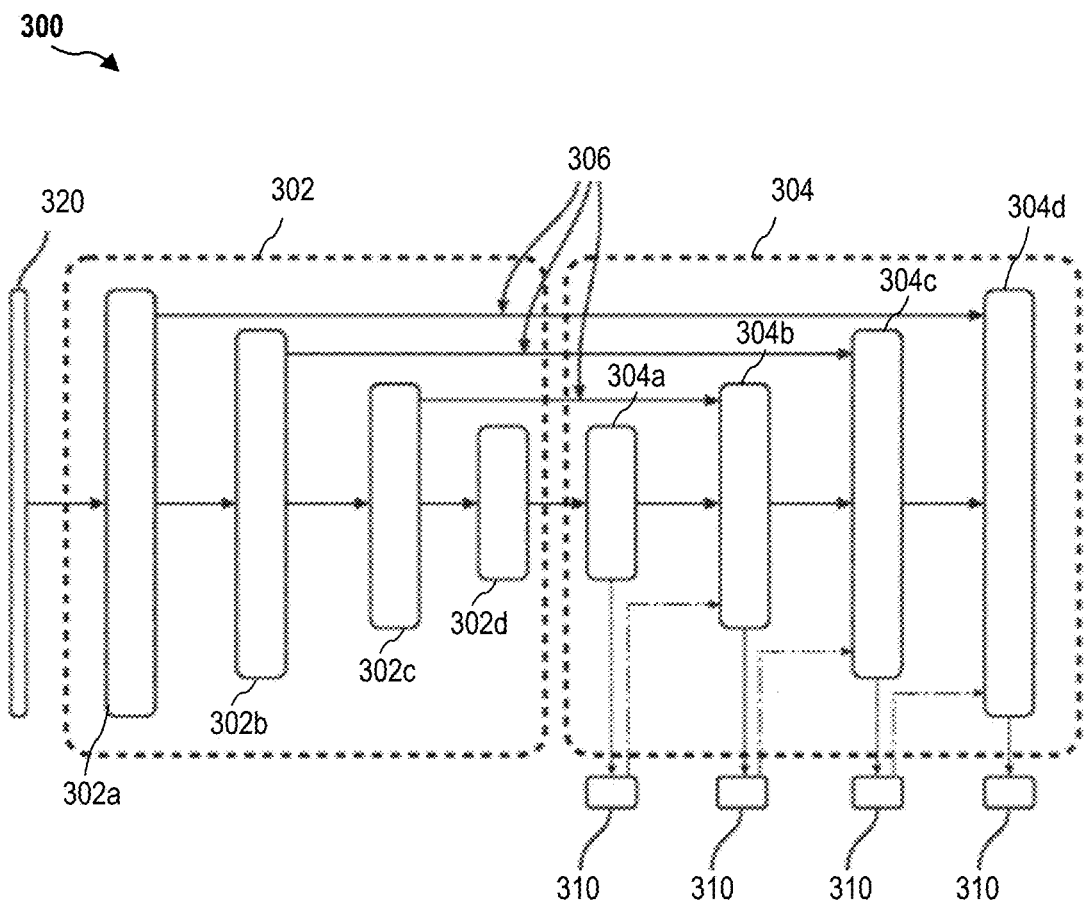
FIG. 3 is a diagram illustrating an example of a depth network, in accordance with aspects of the present disclosure.

FIG. 3 illustrates an example of a depth network 300 according to aspects of the present disclosure. As shown in FIG. 3, the depth network 300 includes an encoder 302 and a decoder 304. The depth network 300 generates a per-pixel depth map, such as the depth map 220 of FIG. 2B, of an input image 320.

The encoder 302 includes multiple encoder layers 302*a-d*. Each encoder layer 302*a-d* may be a packing layer for downsampling features during the encoding process. The decoder 304 includes multiple decoder layers 304*a-d*. In FIG. 3, each decoder layer 304*a-d* may be an unpacking layer for upsampling features during the decoding process. That is, each decoder layer 304*a-d* may unpack a received feature map.

Skip connections 306 transmit activations and gradients between encoder layers 302*a-d* and decoder layers 304*a-d*. The skip connections 306 facilitate resolving higher resolution details. For example, a gradient may be directly back-propagated to layers via the skip connections 306, thereby improving training. Additionally, the skip connections 306 directly transmit image details (e.g., features) from convolutional layers to deconvolutional layers, thereby improving image recovery at higher resolutions.

The decoder layers 304*a-d* may generate intermediate inverse depth maps 310. Each intermediate inverse depth map 310 may be upsampled before being concatenated with a corresponding skip connection 306 and feature maps unpacked by a corresponding decoder layer 304*a-d*. The inverse depth maps 310 also serve as the output of the depth network from which the loss is calculated. In contrast to conventional systems that incrementally super-resolve each inverse depth map 310. Aspects of the present disclosure upsample each inverse depth map 310 to a highest resolution using bilinear interpolation. Upsampling to the highest resolution reduces copy-based artifacts and photometric ambiguity, thus improving depth estimates.

Figure 4:
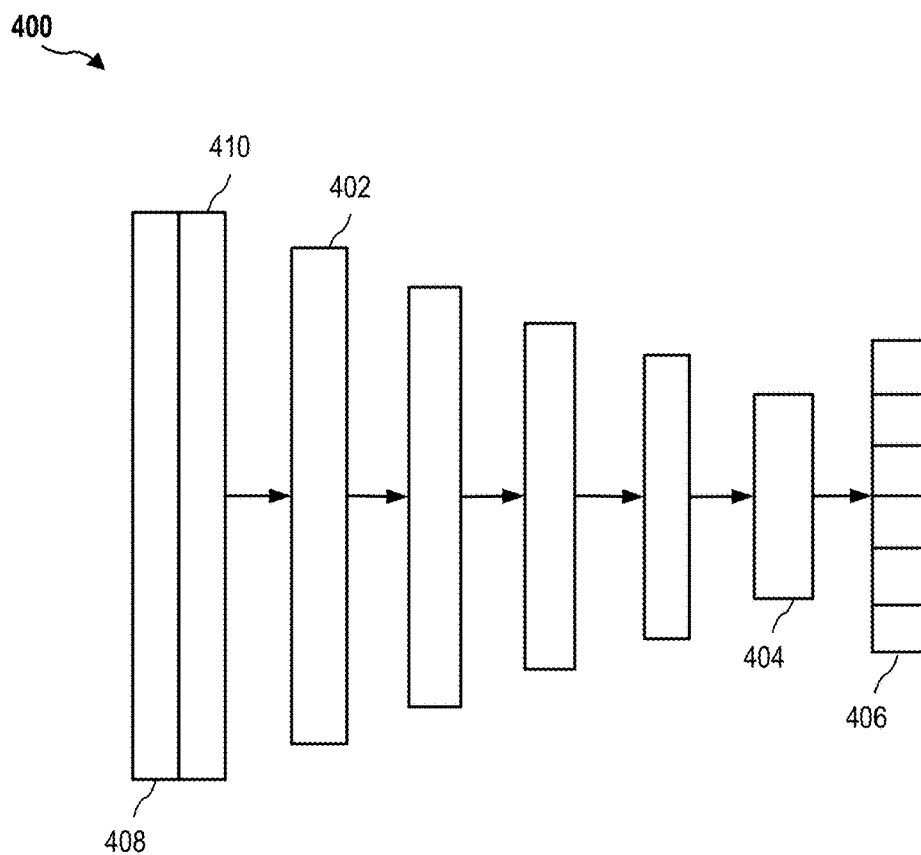
FIG. 4 illustrates an example of a pose network, in accordance with aspects of the present disclosure.

FIG. 4 illustrates an example of a pose network 400 for ego-motion estimation according to aspects of the present disclosure. In contrast to conventional pose networks, the pose network 400 of FIG. 4 does not use explainability masks. The ego-motion may be an example of a motion of a sensor, such as a camera, integrated with an agent, such as an autonomous agent. As shown in FIG. 4, the pose network 400 includes multiple convolutional layers 402, a final convolutional layer 404, and a multi-channel (e.g., six-channel) average pooling layer 406. The final convolutional layer 404 may be a 1×1 layer. The multi-channel layer 406 may be a six-channel layer.

In one configuration, a target image (It) 408 and a source image (Is) 410 are input to the pose network 400. In some examples, the target image 408 and source image 410 may be concatenated when input to the pose network 400. During training, one or more source images 410 may be used during different training epochs. The source images 410 may include an image at a previous time step (t−1) and an image at a subsequent time step (t+1). The output is a set of six DoF transformations between the target image 408 and the source image 410. The process may be repeated for each source image 410 if more than one source image 410 is considered.

Figure 5:
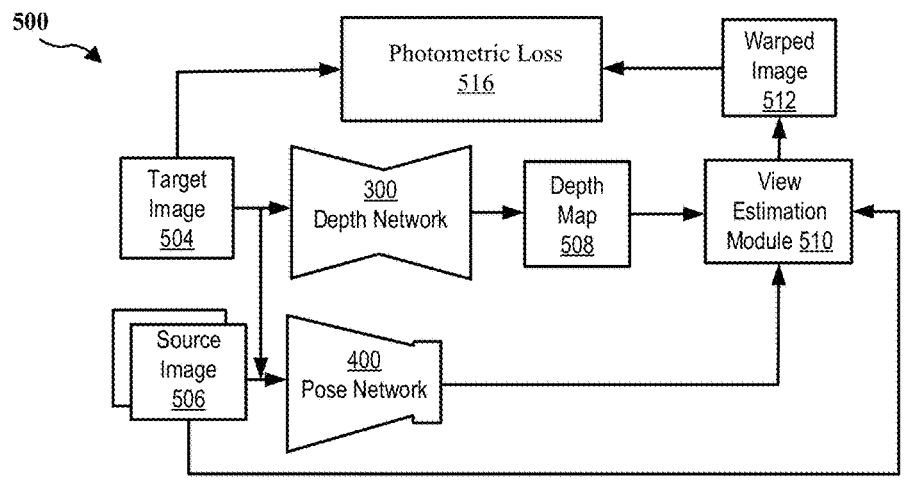
FIG. 5 is a diagram illustrating an example of a training model for a depth estimation model, in accordance with aspects of the present disclosure.

FIG. 5 is a diagram illustrating an example of a pipeline 500 for generating a warped image 512, in accordance with aspects of the present disclosure. As shown in FIG. 5, the depth estimation model includes the depth network 300 from FIG. 3 and the pose network 400 from FIG. 4. The depth network 300 receives a target image (It) 504. The pose network 400 receives the target image 504 and one or more source images (Is) 506. The source images 506 are also referred to as context images.

As shown in FIG. 5, the depth network 300 generates a depth map (Dt) 508 of target image 504. As discussed, the depth map 508 may be a per-pixel depth map. A view estimation module 510 receives the per-pixel depth map 508 and the six DoF transformation (e.g., relative pose) between the target image 504 and the source image 506. The view estimation module 510 inverse warps the source image 506 to reconstruct the target image 504. The inverse warp may also be referred to as a reverse warp. The reconstructed target image 512 may be referred to as the warped image 512 ($\hat{I}_t$).

A view estimation module 510 receives the output of the depth network 300 and the six DoF transformation (e.g., relative pose) output of the pose network 400. As discussed, six DoF transformation determined by the pose network 400 is a transformation between the target image 504 and the source image 506. The view estimation module 510 warps the target image 504 into the source image 506 to reconstruct the target image 504. The reconstructed target image may be referred to as the warped image 512 ($\hat{I}_t$).

Specifically, the view estimation module 510 generates the warped image 512 by sampling pixels from the source image 506 based on the predicted depth map 508 and the six DoF transformation. For example, each point (e.g., pixel) in the target image 504 may be projected on the source image 506 based on the predicted depth map 508 and camera pose. After projecting the point to the source image 506, bilinear interpolation may be used to warp the point to the warped image 512. That is, bilinear interpolation obtain the values (e.g., RGB values) of the point in the warped image 512 based on the source image 506.

That is, the location (e.g., x, y coordinates) of a pixel in the warped image 512 may correspond to the location of the target pixel from the target image 504. However, in the warped image 512, a color value of the pixel may be based on respective color values of one or more pixels neighboring a source pixel of the source image 506, where the source pixel corresponds to the target pixel. In some examples, the location of the source pixel in the source image 506 may be different from a location of the target pixel in the target image 504. As an example, the target pixel may be projected onto the source image 506. In some examples, bilinear interpolation of pixels neighboring a location of the target pixel projected onto the source image 506 may approximate a value (e.g., color value) of the projected target pixel. The approximated value may be used as the value of the pixel in the warped image 512. In some examples, the bilinear sampling mechanism linearly interpolates values of multiple pixel neighbors (such as, top-left, top-right, bottom-left, and bottom-right) of the target pixel projected onto the source image 506. That is, a value of a color of the pixel in the warped image 512 may be based on respective color values of neighboring pixels in the source image 506. In such examples, the warped image 512 may be a 3D reconstruction of the target image 504. As described, the target image 504 is a 2D image. In some such examples, the warped image 512 may be an example of a reconstruction of the target image 504.

A photometric loss is calculated based on the difference between the target image 504 and the warped image 512 (e.g., the warped source image that approximates the target image). In the example of FIG. 5, the pipeline 500 determines a photometric loss 516 based on a comparison of the warped image 512 and the target image 504. The photometric loss 516 may be used to update the depth network 300, the view estimation module 510, and/or the pose network 400.

The photometric loss 516 ($L_p$) may be determined as follows:

$$L_p(I_t, \hat{I}_t) = \alpha \frac{1 - SSIM(I_t, \hat{I}_t)}{2} + (1-\alpha)\|I_t - \hat{I}_t\|, \quad (1)$$

where SSIM( ) is a function for estimating a structural similarity (SSIM) between the target image 504 and the warped image 512. SSIM may be determined as follows:

$$SSIM(x,y)=[l(x,y)]^\alpha \cdot [c(x,y)]^\beta \cdot [s(x,y)]^\gamma, \quad (2)$$

where s( ) determines a structure similarity, c( ) determines a contrast similarity, and l( ) determines a luminance similarity. α, β, and γ are parameters for adjusting a relative importance of each component, and each parameter is greater than zero.

During a testing stage, the pipeline 500 may generate the warped image 512 as described above. The photometric loss 516 may not be calculated during a testing stage. The warped image 512 may be used for localization and/or other vehicle navigation tasks.

As described, during a training phase, the pipeline 500 of FIG. 5 may be used to train a depth estimation model based on the photometric loss 516 between the warped image 512 and the target image 504. The depth estimation model may be an example of a monocular depth network. As described, the warped image 512 may be an example of a 3D reconstruction of the 2D target image 504. In some examples, it may be desirable to further refine a pose estimate generated by a pose network, such as the pose network 400 of FIGS. 4 and 5. In some implementations, an additional pose network is specified to determine a residual pose based on a difference between a depth estimate of the warped image 512 and a depth estimate of the source image 506. The depth estimate may also be referred to as a depth map.

Figure 6:
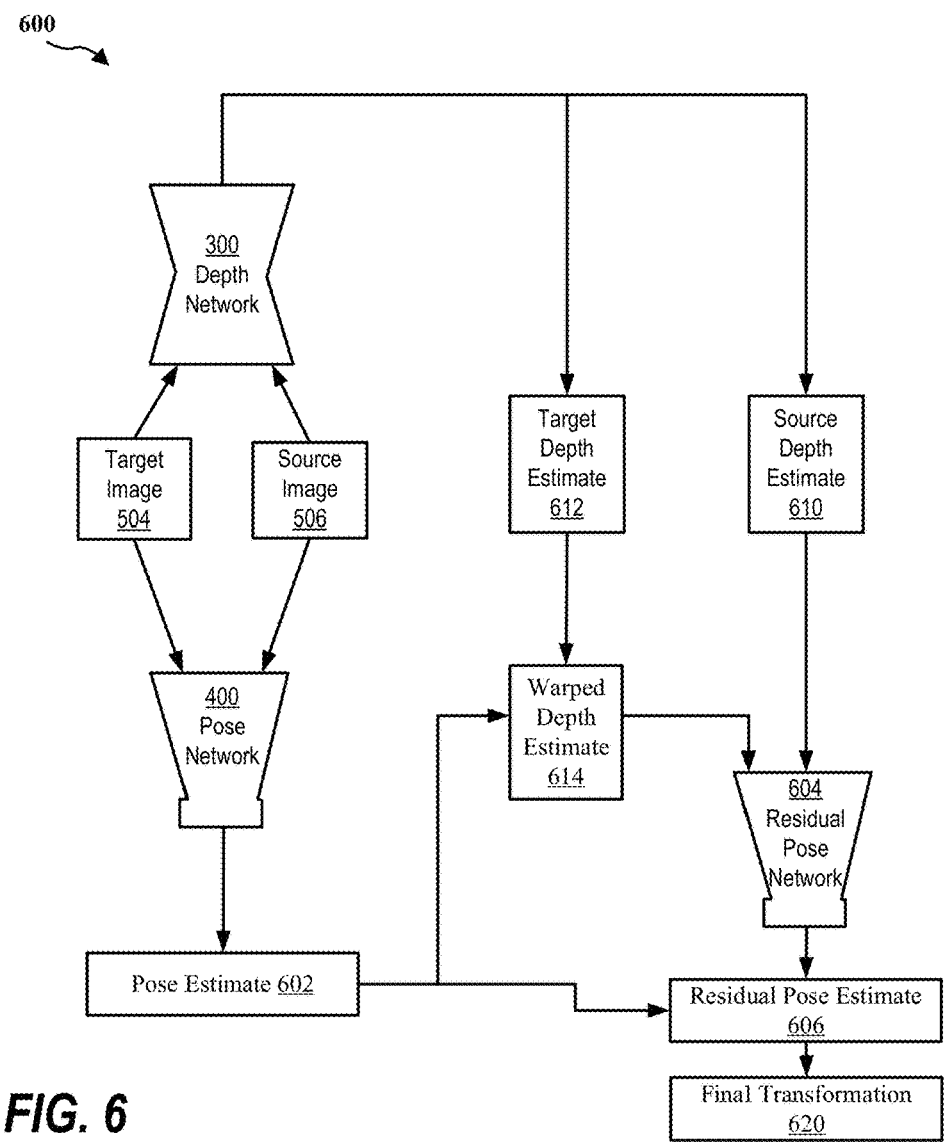
FIG. 6 is a block diagram illustrating an example of a residual pose estimation model, in accordance with aspects of the present disclosure.

FIG. 6 is a block diagram illustrating an example of a residual pose estimation model 600, in accordance with aspects of the present disclosure. As shown in FIG. 6, the source image 506 may be input to the depth network 300 to generate a source depth estimate 610 (e.g., a depth estimate of the source image 506). Additionally, the target image 504 may be input to the depth network 300 to generate a target depth estimate 612 (e.g., a depth estimate of the target image 504).

Additionally, as shown in FIG. 6, the source image 506 and the target image 504 may be input to the pose network 400 to generate a pose estimate 602. As described, the pose estimate 602 may be a six DoF transformation (e.g., relative pose) between the target image 504 and the source image 506. In such examples, the target image 504 may be a current image at a current time t and the source image 506 may be a previous image at time t−1 or a future image at time t+1. As described with reference to FIG. 5, the pose estimate 602 may be used to generate a warped image 512.

In some implementations, as shown in FIG. 6, the pose estimate 602 may be used to estimate a residual pose estimate 606. In such implementations, a warped depth estimate 614 of the target depth estimate 612 may be generated based on the pose estimate 602. The warped depth estimate 614 may be computed by transforming the target depth estimate 612 according to the pose estimate 602. The transformation module (not shown) may warp the target depth estimate 612. The warped depth estimate 614 and the source depth estimate 610 may be input to the residual pose network 604 which may minimize a geometric difference between the warped depth estimate 614 and the source depth estimate 610. The residual pose network 604 may output a residual pose estimate 606. In some examples, the residual pose estimate 606 may be parameterized by a 6-DoF transformation. Additionally, the residual pose estimate 606 may be combined with the pose estimate 602, yielding a final transformation 620 between target image 504 and source Image 506. The final transformation 620 may be used in a view estimation module, such as the view estimation module 510 of FIG. 5, to improve an accuracy of warped source images and warp the source image.

In some such implementations, the target depth estimate 612 is warped based on the pose estimate 602 to have a same pose as the source depth estimate 610. Therefore, in a lossless scenario, a loss between a pose of the warped depth estimate 614 and the source depth estimate 610 would be zero. Still, in most cases, errors in one or both of the depth network 300 or pose network 400 may be propagated to one or more of the pose estimate 602, the target depth estimate 612, the source depth estimate 610, or the warped depth estimate 614. Thus, it may be desirable to identify such errors by estimating a residual pose 606 between the warped depth estimate 614 and the source depth estimate 610. In some examples, the residual pose estimate 606 is a difference between a pose of the warped depth estimate 614 and a pose of the source depth estimate 610.

In some implementations, an architecture of the residual pose network 604 may be similar to the pose network 400. Still, as shown in FIG. 6, an input of the residual pose network 604 may be different form an input of the pose network 400. For example, the residual pose network 604 may receive depth maps and the pose network 400 may receive RGB images.

In some examples, during testing, the residual pose estimate 606 may be used to refine the initial pose estimate 602, thereby accounting for errors induced based on a photometric loss 516. In some such examples, a 3D image, such as a warped image 512 may be updated based on the residual pose estimate 606. The update may increase an accuracy of the warped image 512. Additionally, or alternatively, the residual pose estimate 606 may update weights of one or both of the depth network 300 or the pose network 400. In some examples, the weights may be updated during training.

As described, aspects of the present disclosure specify a residual depth estimate model including an additional pose network, such as a residual pose network, that generates a residual pose based on a depth estimate of a warped image and a depth estimate of a source image. The warped image may be an example of a target image warped into the source image.

As described above, in some systems, such as the system of FIG. 5, a target image may be warped into a source image based on an initial pose. In such systems, a photometric loss, such as the photometric loss of EQUATION 1, may be determined based on a difference between the warped image and the target image. Still, it may be desirable to define a loss of the initial pose with respect to a ground truth pose. In such examples, a residual pose may further account for errors with respect to a ground truth pose. Such that a residual pose network of the current disclosure determines a difference between the initial pose and the ground truth pose. The difference between the initial pose and the ground truth pose may be referred to as a residual pose.

In some implementations, the determined residual pose accounts for geometric information and improves a consistency of depth estimates between the target and source views. The residual pose may also correct the initial pose estimate. The target depth may be corrected directly, or indirectly, based on a correction of the initial pose estimate.

In some examples, the residual pose regression may provide an additional supervisory signal for both the pose network and the depth network. The learning of the pose network and the depth network may be simultaneously performed as a combination.

As discussed, conventional systems may use LIDAR sensors to build a 3D spatial representation of an environment. LIDAR sensors have shown strong performance, especially in high-dynamic range regimes. Cameras, such as an RGB camera, may provide both a dense semantic and spatial understanding of a scene by reasoning across space (stereo, multi-camera) and time (multi-view reconstruction). Aspects of the present disclosure self-supervise the task of image-based metric depth estimation by bootstrapping geometric constraints inherent in agents, such as autonomous vehicles.

Aspects of the present disclosure may be used for 3D metric reconstruction and understanding of scenes from monocular depth estimation and ego-motion estimation. The ability to bootstrap and learn a metric depth network from monocular camera sensors and localization information (e.g., GPS) may benefit fusion stages for 3D spatial reconstruction (either from single/multi-view monocular imagery, or from both LiDAR and monocular imagery combined). Visual sensors, such as an RGB camera, may augment, complement, or substitute information obtained from LIDAR sensors.

Figure 7:
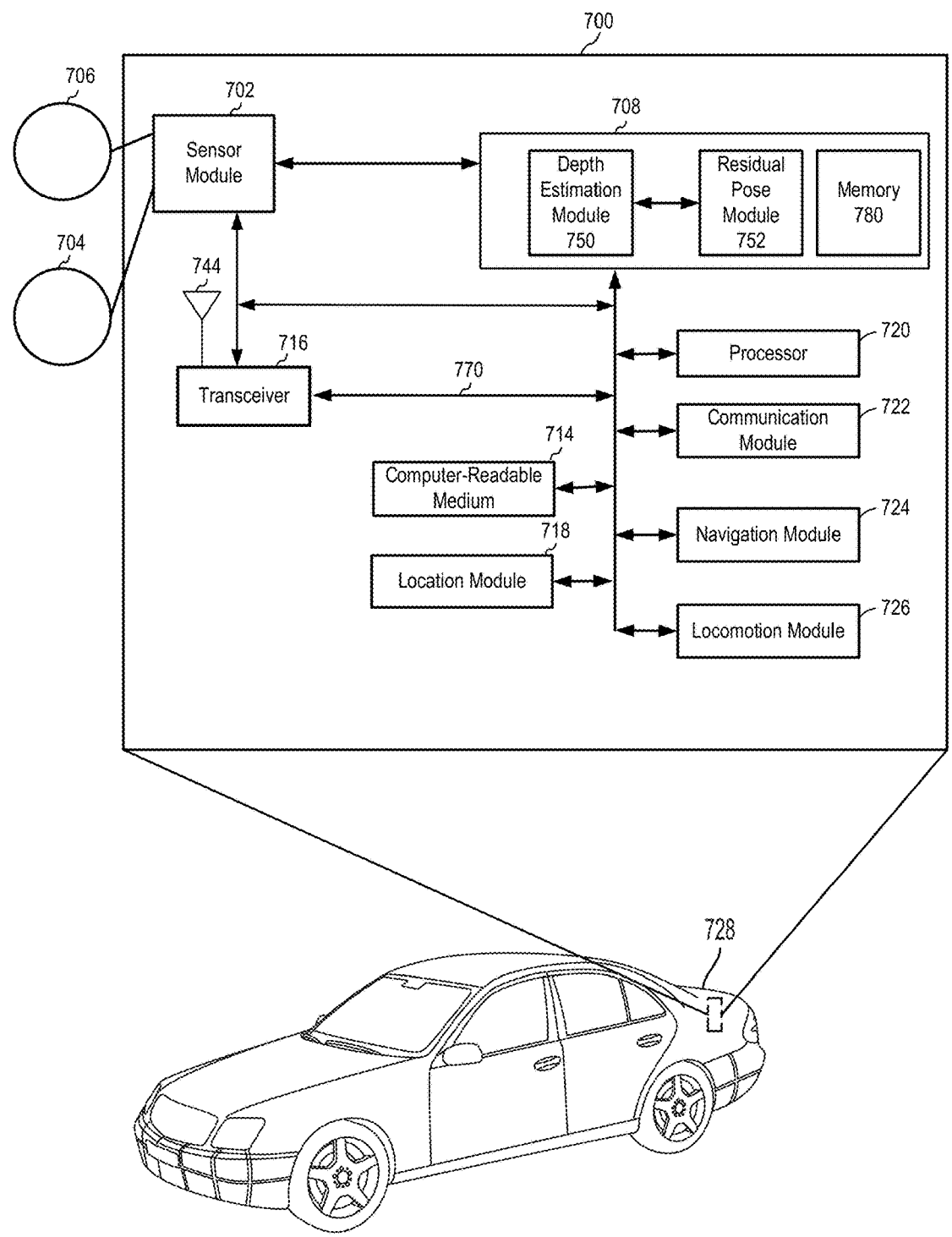
FIG. 7 is a diagram illustrating an example of a hardware implementation for a depth estimation system, in accordance with aspects of the present disclosure.

FIG. 7 is a diagram illustrating an example of a hardware implementation for a vehicle system 700, in accordance with aspects of the present disclosure. The vehicle system 700 may be a component of a vehicle, a robotic device, or another device. For example, as shown in FIG. 7, the vehicle system 700 is a component of a vehicle 728. Aspects of the present disclosure are not limited to the vehicle system 700 being a component of the vehicle 728, as other types of agents, such as a bus, boat, drone, or robot, are also contemplated for using the vehicle system 700.

The vehicle 728 may operate in one or more of an autonomous operating mode, a semi-autonomous operating mode, and a manual operating mode. Furthermore, the vehicle 728 may be an electric vehicle, a hybrid vehicle, a fuel vehicle, or another type of vehicle.

The vehicle system 700 may be implemented with a bus architecture, represented generally by a bus 770. The bus 770 may include any number of interconnecting buses and bridges depending on the specific application of the vehicle system 700 and the overall design constraints. The bus 770 links together various circuits including one or more processors and/or hardware modules, represented by a processor 720, a communication module 722, a location module 718, a sensor module 702, a locomotion module 726, a navigation module 724, and a computer-readable medium 714. The bus 770 may also link various other circuits such as timing sources, peripherals, voltage regulators, and power management circuits, which are well known in the art, and therefore, will not be described any further.

The vehicle system 700 includes a transceiver 716 coupled to the processor 720, the sensor module 702, a depth estimation system 708, the communication module 722, the location module 718, the locomotion module 726, the navigation module 724, and the computer-readable medium 714. The transceiver 716 is coupled to an antenna 444.

The vehicle system 700 includes the processor 720 coupled to the computer-readable medium 714. The processor 720 performs processing, including the execution of software stored on the computer-readable medium 714 providing functionality according to the disclosure. The software, when executed by the processor 720, causes the vehicle system 700 to perform the various functions described for a particular device, such as the vehicle 728, or any of the modules 702, 708, 714, 716, 718, 720, 722, 724, 726. The computer-readable medium 714 may also be used for storing data that is manipulated by the processor 720 when executing the software.

The sensor module 702 may be used to obtain measurements via different sensors, such as a first sensor 706 and a second sensor 704. The first sensor 706 may be a vision sensor, such as a stereoscopic camera or a red-green-blue (RGB) camera, for capturing 2D images. The second sensor 704 may be a ranging sensor, such as a light detection and ranging (LIDAR) sensor or a radio detection and ranging (RADAR) sensor. Of course, aspects of the present disclosure are not limited to the aforementioned sensors as other types of sensors, such as, for example, thermal, sonar, and/or lasers are also contemplated for either of the sensors 704, 706.

The measurements of the first sensor 706 and the second sensor 704 may be processed by one or more of the processor 720, the sensor module 702, the depth estimation system 708, the communication module 722, the location module 718, the locomotion module 726, the navigation module 724, in conjunction with the computer-readable medium 714 to implement the functionality described herein. In one configuration, the data captured by the first sensor 706 and the second sensor 704 may be transmitted to an external device via the transceiver 716. The first sensor 706 and the second sensor 704 may be coupled to the vehicle 728 or may be in communication with the vehicle 728.

The location module 718 may be used to determine a location of the vehicle 728. For example, the location module 718 may use a global positioning system (GPS) to determine the location of the vehicle 728. The communication module 722 may be used to facilitate communications via the transceiver 716. For example, the communication module 722 may be configured to provide communication capabilities via different wireless protocols, such as WiFi, long term evolution (LTE), 4G, etc. The communication module 722 may also be used to communicate with other components of the vehicle 728 that are not modules of the vehicle system 700.

The locomotion module 726 may be used to facilitate locomotion of the vehicle 728. As an example, the locomotion module 726 may control a movement of the wheels. As another example, the locomotion module 726 may be in communication with one or more power sources of the vehicle 728, such as a motor and/or batteries. Of course, aspects of the present disclosure are not limited to providing locomotion via wheels and are contemplated for other types of components for providing locomotion, such as propellers, treads, fins, and/or jet engines.

The vehicle system 700 also includes the navigation module 724 for planning a route or controlling the locomotion of the vehicle 728, via the locomotion module 726. The navigation module 724 may override user input when the user input is expected (e.g., predicted) to cause a collision. The modules may be software modules running in the processor 720, resident/stored in the computer-readable medium 714, one or more hardware modules coupled to the processor 720, or some combination thereof.

The depth estimation system 708 may include a depth estimation module 750, a residual pose module 752, and a memory 780. The memory 780 may include volatile and/or non-volatile memory. For example, the memory 780 may be read only memory (ROM), programmable ROM (PROM), electronic programmable ROM (EPROM), electronic erasable PROM (EEPROM), flash memory, random access memory (RAM), or other types of volatile or non-volatile memory. Additionally, the RAM may be, for example, synchronous RAM (SRAM), dynamic RAM (DRAM), synchronous DRAM (SDRAM), double data rate SDRAM (DDR SDRAM), enhanced SDRAM (ESDRAM), sync link DRAM, (SLDRAM), direct RAM bus RAM (DRRAM), or other types of RAM.

The residual pose module 752 may be an example of the residual pose network 600 of FIG. 6. The depth estimation module 750 may be an example of the pipeline 500 of FIG. 5. In some implementations, working in conjunction with one or more of the memory 780, the sensor module 702, the first sensor 706, the second sensor 704, the processor 720, and the computer-readable medium 714, the depth estimation system 708 may determine a first pose of a sensor based on a first image captured by the sensor and a second image captured by the sensor. In such implementations, working in conjunction with one or more of the depth estimation module 750, the memory 780, the processor 720, and the computer-readable medium 714, the depth estimation system 708 may determine a first depth of the first image and a second depth of the second image.

Additionally, working in conjunction with one or more of the residual pose module 752, the memory 780, the processor 720, and the computer-readable medium 714, the depth estimation system 708 may generate a warped depth image based on at least the first depth and the first pose. Furthermore working in conjunction with one or more of the residual pose module 752, the memory 780, the processor 720, and the computer-readable medium 714, the depth estimation system 708 may determine a second pose based on the warped depth image and the second depth image. In some implementations, working in conjunction with one or more of the depth estimation module 750, the memory 780, the residual pose module 752, the processor 720, and the computer-readable medium 714, the depth estimation system 708 may update the first pose based on the second pose and update a first warped image based on the updated first pose.

In some such implementations, working in conjunction with one or more of the residual pose module 752, the memory 780, the processor 720, the computer-readable medium 714, navigation module 724, location module 718, and locomotion module 726, the depth estimation system 708 may control an action of the autonomous agent based on the first warped image and adjusting the action in response the updated first warped image.

The National Highway Traffic Safety Administration (NHTSA) has defined different "levels" of autonomous vehicles (e.g., Level 0, Level 1, Level 2, Level 3, Level 4, and Level 5). For example, if an autonomous vehicle has a higher level number than another autonomous vehicle (e.g., Level 3 is a higher level number than Levels 2 or 1), then the autonomous vehicle with a higher level number offers a greater combination and quantity of autonomous features relative to the vehicle with the lower level number. These different levels of autonomous vehicles are described briefly below.

Level 0: In a Level 0 vehicle, the set of advanced driver assistance system (ADAS) features installed in a vehicle provide no vehicle control, but may issue warnings to the driver of the vehicle. A vehicle which is Level 0 is not an autonomous or semi-autonomous vehicle.

Level 1: In a Level 1 vehicle, the driver is ready to take driving control of the autonomous vehicle at any time. The set of ADAS features installed in the autonomous vehicle may provide autonomous features such as: adaptive cruise control (ACC); parking assistance with automated steering; and lane keeping assistance (LKA) type II, in any combination.

Level 2: In a Level 2 vehicle, the driver is obliged to detect objects and events in the roadway environment and respond if the set of ADAS features installed in the autonomous vehicle fail to respond properly (based on the driver's subjective judgement). The set of ADAS features installed in the autonomous vehicle may include accelerating, braking, and steering. In a Level 2 vehicle, the set of ADAS features installed in the autonomous vehicle can deactivate immediately upon takeover by the driver.

Level 3: In a Level 3 ADAS vehicle, within known, limited environments (such as freeways), the driver can safely turn their attention away from driving tasks, but must still be prepared to take control of the autonomous vehicle when needed.

Level 4: In a Level 4 vehicle, the set of ADAS features installed in the autonomous vehicle can control the autonomous vehicle in all but a few environments, such as severe weather. The driver of the Level 4 vehicle enables the automated system (which is comprised of the set of ADAS features installed in the vehicle) only when it is safe to do so. When the automated Level 4 vehicle is enabled, driver attention is not required for the autonomous vehicle to operate safely and consistent within accepted norms.

Level 5: In a Level 5 vehicle, other than setting the destination and starting the system, no human intervention is involved. The automated system can drive to any location where it is legal to drive and make its own decision (which may vary based on the jurisdiction where the vehicle is located).

A highly autonomous vehicle (HAV) is an autonomous vehicle that is Level 3 or higher. Accordingly, in some configurations the vehicle 728 may be one of a Level 0 non-autonomous vehicle, a Level 1 autonomous vehicle, a Level 2 autonomous vehicle, a Level 3 autonomous vehicle, a Level 4 autonomous vehicle, or a Level 5 autonomous vehicle.

Figure 8:
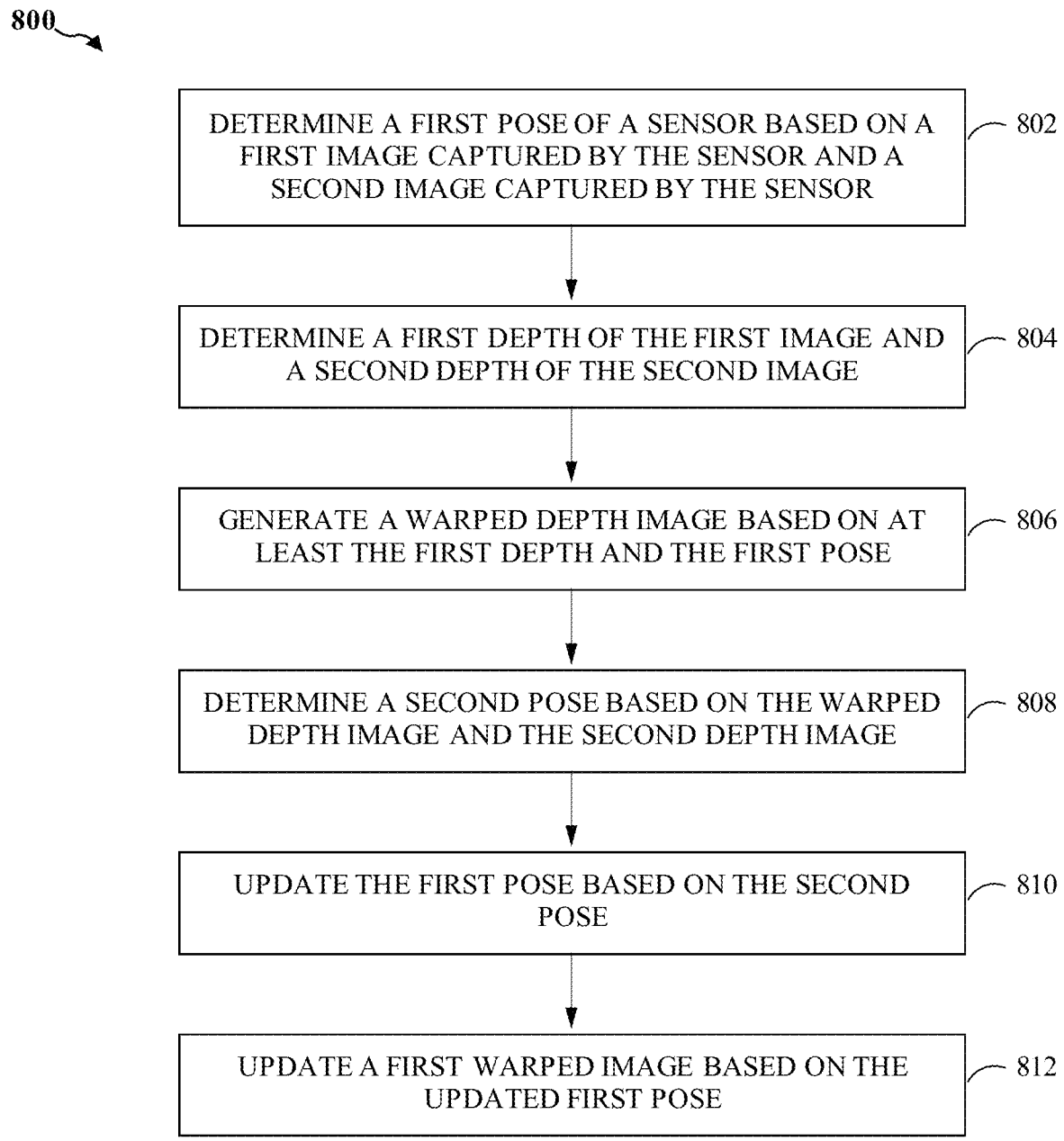
FIG. 8 is a diagram illustrating an example process performed, for example, with a depth estimation model, in accordance with various aspects of the present disclosure.

FIG. 8 is a diagram illustrating an example process 800 performed, for example, with a depth estimation model, in accordance with various aspects of the present disclosure. The example process 800 is an example of updating an initial pose estimate based on a residual pose estimate. In some implementations, the process 800 may be performed by a residual pose estimation model, such as the residual pose estimation model 600 described above with reference to FIG. 6. The residual pose estimation model may be a component of an agent, such as the ego vehicle 100 or the vehicle 728 described above with reference to FIGS. 1 and 7, respectively.

In some implementations, the process 800 begins in block 802 with determining a first pose of a sensor based on a first image captured by the sensor and a second image captured by the sensor. Additionally, at block 804, the process 800 determines a first depth of the first image and a second depth of the second image. Furthermore, at block 806, the process generates a warped depth image based on at least the first depth and the first pose.

In such implementations, at block 808, the process 800 determines a second pose based on the warped depth image and the second depth image. Additionally, at block 810, the process 800 updates the first pose based on the second pose. Finally, at block 812, the process 800 updates a first warped image based on the updated first pose. In some implementations, the process 800 may also control an action of the autonomous agent based on the first warped image and adjusting the action in response the updated first warped image.

Based on the teachings, one skilled in the art should appreciate that the scope of the present disclosure is intended to cover any aspect of the present disclosure, whether implemented independently of or combined with any other aspect of the present disclosure. For example, an apparatus may be implemented or a method may be practiced using any number of the aspects set forth. In addition, the scope of the present disclosure is intended to cover such an apparatus or method practiced using other structure, functionality, or structure and functionality in addition to, or other than the various aspects of the present disclosure set forth. It should be understood that any aspect of the present disclosure may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the present disclosure. Although some benefits and advantages of the preferred aspects are mentioned, the scope of the present disclosure is not intended to be limited to particular benefits, uses or objectives. Rather, aspects of the present disclosure are intended to be broadly applicable to different technologies, system configurations, networks and protocols, some of which are illustrated by way of example in the figures and in the following description of the preferred aspects. The detailed description and drawings are merely illustrative of the present disclosure rather than limiting, the scope of the present disclosure being defined by the appended claims and equivalents thereof.

As used herein, the term "determining" encompasses a wide variety of actions. For example, "determining" may include calculating, computing, processing, deriving, investigating, looking up (e.g., looking up in a table, a database or another data structure), ascertaining and the like. Additionally, "determining" may include receiving (e.g., receiving information), accessing (e.g., accessing data in a memory) and the like. Furthermore, "determining" may include resolving, selecting, choosing, establishing, and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a processor specially configured to perform the functions discussed in the present disclosure. The processor may be a neural network processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. Alternatively, the processing system may comprise one or more neuromorphic processors for implementing the neuron models and models of neural systems described herein. The processor may be a microprocessor, controller, microcontroller, or state machine specially configured as described herein. A processor may also be implemented as a combination of computing devices, e.g., a combination of a DSP and a microprocessor, a plurality of microprocessors, one or more microprocessors in conjunction with a DSP core, or such other special configuration, as described herein.

The steps of a method or algorithm described in connection with the present disclosure may be embodied directly in hardware, in a software module executed by a processor, or in a combination of the two. A software module may reside in storage or machine readable medium, including random access memory (RAM), read only memory (ROM), flash memory, erasable programmable read-only memory (EPROM), electrically erasable programmable read-only memory (EEPROM), registers, a hard disk, a removable disk, a CD-ROM or other optical disk storage, magnetic disk storage or other magnetic storage devices, or any other medium that can be used to carry or store desired program code in the form of instructions or data structures and that can be accessed by a computer. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and processing, including the execution of software stored on the machine-readable media. Software shall be construed to mean instructions, data, or any combination thereof, whether referred to as software, firmware, middleware, microcode, hardware description language, or otherwise.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or specialized register files. Although the various components discussed may be described as having a specific location, such as a local component, they may also be configured in various ways, such as certain components being configured as part of a distributed computing system.

The machine-readable media may comprise a number of software modules. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a special purpose register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a computer-readable medium. Computer-readable media include both computer storage media and communication media including any storage medium that facilitates transfer of a computer program from one place to another.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means, such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes, and variations may be made in the arrangement, operation, and details of the methods and apparatus described above without departing from the scope of the claims.

What is claimed is:

1. A method for depth estimation performed by a depth estimation system associated with an agent, comprising:
   determining a first depth of a first image and a second depth of a second image, the first image and the second image being captured by a sensor associated with the agent;
   generating a first three-dimensional (3D) image of the first image based on the first depth, a first pose associated with the sensor, and the second image;
   generating a warped depth image based on transforming the first depth in accordance with the first pose;
   determining a residual pose estimate between the warped depth image and the second depth, the residual pose estimate being parameterized by a six-degree of freedom (DoF) transformation;
   updating the first pose based on the residual pose estimate;
   updating the first 3D image in accordance with the updated first pose; and
   controlling an action of the agent in accordance with the updated first 3D image.

2. The method of claim 1, further comprising:
   determining the first pose via a first pose estimation model; and
   determining the residual pose estimate via a residual pose estimation model.

3. The method of claim 1, further comprising adjusting a previous action associated with the first 3D image in accordance with controlling the action of the agent.

4. The method of claim 1, wherein the sensor is a monocular camera.

5. The method of claim 1, wherein:
   the first 3D image is generated by projecting pixels of the first image onto corresponding locations of the second image based on the first depth and the first pose; and
   the projected pixels are interpolated based on one or more color values of neighboring pixels of the second image.

6. The method of claim 1, wherein the agent operates in one or more of an autonomous mode or a semi-autonomous mode.

7. The method of claim 6, wherein the agent is a vehicle.

8. An apparatus for depth estimation performed by a depth estimation system associated with an agent, comprising:
   at least one processor; and
   at least one memory coupled with the at least one processor and storing instructions operable, when executed by the at least one processor, to cause the apparatus to:
      determine a first depth of a first image and a second depth of a second image, the first image and the second image being captured by a sensor associated with the agent;
      generate a first three-dimensional (3D) image of the first image based on the first depth, a first pose associated with the sensor, and the second image;
      generate a warped depth image based on transforming the first depth in accordance with the first pose;
      determine a residual pose estimate between the warped depth image and the second depth, the residual pose estimate being parameterized by a six-degree of freedom (DoF) transformation;
      update the first pose based on the residual pose estimate;
      update the first 3D image in accordance with the updated first pose; and
      control an action of the agent in accordance with the updated first 3D image.

9. The apparatus of claim 8, wherein execution of the instructions further cause the apparatus to:
   determine the first pose via a first pose estimation model; and
   determine the residual pose estimate-via a residual pose estimation model.

10. The apparatus of claim 8, wherein execution of the instructions further cause the apparatus to adjust a previous action associated with the first 3D image in accordance with controlling the action of the agent.

11. The apparatus of claim 8, wherein the sensor is a monocular camera.

12. The apparatus of claim 8, wherein:
   the first 3D image is generated by projecting pixels of the first image onto corresponding locations of the second image based on the first depth and the first pose; and
   the projected pixels are interpolated based on one or more color values of neighboring pixels of the second image.

13. The apparatus of claim 8, wherein the agent operates in one or more of an autonomous mode, a manual mode, or a semi-autonomous mode.

14. The apparatus of claim 13, wherein the agent is a vehicle.

15. A non-transitory computer-readable medium having program code recorded thereon for depth estimation performed by a depth estimation system associated with an agent, the program code executed by a processor and comprising:
   program code to determine a first depth of a first image and a second depth of a second image, the first image and the second image being captured by a sensor associated with the agent;
   program code to generate a first three-dimensional (3D) image of the first image based on the first depth, a first pose associated with the sensor, and the second image;
   program code to generate a warped depth image based on transforming the first depth in accordance with the first pose;
   program code to determine a residual pose estimate between the warped depth image and the second depth, the residual pose estimate being parameterized by a six-degree of freedom (DoF) transformation;
   program code to update the first pose based on the residual pose estimate;
   program code to update the first 3D image in accordance with the updated first pose; and
   program code to control an action of the agent in accordance with the updated first 3D image.

16. The non-transitory computer-readable medium of claim 15, wherein the program code further comprises:
   program code to determine the first pose via a first pose estimation model; and
   program code to determine the residual pose estimate via a residual pose estimation model.

17. The non-transitory computer-readable medium of claim 15, wherein the program code further comprises program code to adjust a previous action associated with the first 3D image in accordance with controlling the action of the agent.

18. The non-transitory computer-readable medium of claim 15, wherein the sensor is a monocular camera.

19. The non-transitory computer-readable medium of claim 15, wherein:
   the first 3D image is generated by projecting pixels of the first image onto corresponding locations of the second image based on the first depth and the first pose; and
   the projected pixels are interpolated based on one or more color values of neighboring pixels of the second image.

20. The non-transitory computer-readable medium of claim 15, wherein the agent operates in one or more of an autonomous mode, a manual mode, or a semi-autonomous mode.

* * * * *